2,909,553

NITROGENOUS ESTERS

John A. Stephens, Dayton, Ohio, assignor to Monsanto Chemical Company, St. Louis, Mo., a corporation of Delaware No Drawing. Application April 5, 1957
Serial No. 650,835

3 Claims. (Cl. 260—453)

The present invention relates to nitrogenous esters and more particularly provides a new and valuable class of formimidates, the method of preparing the same, and biological toxicants comprising the formimidates.

According to the invention there are provided certain alkyl N-dichlorophenylformimidates by the reaction of alkyl orthoformates with dichloroanilines, substantially according to the scheme:

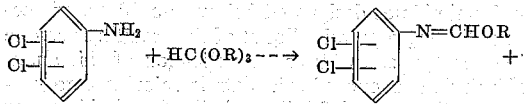

in which R is an alkyl radical of from 1 to 5 carbon atoms.

Alkyl N-dichlorophenylformimidates having the above formula and provided by the invention are, e.g., methyl N-2,3-dichlorophenylformimidate, methyl N-3,4-dichlorophenylformimidate, methyl N-3,5-dichlorophenylformimidate, ethyl N-2,6-dichlorophenylformimidate, ethyl N-2,3-dichlorophenylformimidate, ethyl N-2,4-dichlorophenylformimidate, n-propyl N-3,4-dichlorophenylformimidate, isopropyl N-2,5-dichlorophenylformimidate, n-butyl N-2,3-dichlorophenylformimidate, isobutyl N-3,5-dichlorophenylformimidate, n-amyl N-3,4-dichlorophenylformimidate, n-amyl N-2,6-dichlorophenylformimidate, isoamyl N-2,5-dichlorophenylformimidate, etc.

Dichloroanilines which are reacted with appropriate alkyl orthoformates includes 2,3- 3,4- 2,6- 2,4- 3,5- and 2,5-dichloroaniline. The presently useful alkyl orthoformates are methyl, ethyl, n-propyl, isopropyl, n-butyl, isobutyl, n-amyl, and isoamyl orthoformates.

According to the invention the present alkyl N-dichlorophenylforimidates are prepared by contacting the appropriate dichloroaniline with the appropriate alkyl orthoformate at ordinary or increased temperatures and in the presence or absence of an acidic agent as catalyst. Thus, the reaction may be effected by simply mixing the two reactants and catalyst, in the presence or absence of an inert diluent or solvent, and heating the resulting mixture at a temperature of from, say, 40° C. to the refluxing temperature. Since preparation of the present formimidates involves condensation of one mole of the dichloroaniline with one mole of the orthoformate, the reactants may be advantageously used in equimolar proportions; however, an excess of the alkyl orthoformate is generally useful in that it serves as a reaction diluent and at the same time makes for adequate availability of the orthoformate whereby formation of by-product amidines is minimized. Excess alkyl orthoformate, when employed, is readily removed from the reaction product, e.g., by distillation.

Operation in the presence of acidic catalysts, generally, is advantageous. As examples of useful catalysts may be mentioned acid reacting salts such as cuprous or cupric, stannous or stannic, ferrous or ferric acetates, sulfates or chlorides, organic or inorganic acids such as acetic, oxalic, benzenesulfonic, 4-toluene-sulfonic, sulfuric, hydrochloric or phosphoric acid, etc.

As shown in the above reaction scheme, condensation of one mole of the dichloroaniline with one mole of the alkyl orthoformate takes place with the formation of 2 moles of an alkanol as a by-product. This may be removed from the reaction product after the condensation has been completed; but, more conveniently, provision for collecting the alkanol during the reaction is made by conducting the reaction by refluxing temperature in apparatus comprising a distilling condenser and/or trap, whereby the volatilized alkanol is removed as it is formed. Progress of the reaction may thus be determined by noting the quantity of alkanol collected.

When the reaction is effected in the presence of an acidic catalyst, treatment of the reaction product with a base may be employed in order to neutralize the acid content thereof previous to isolation of the formimidate product. However, such a neutralization step is not necessary, particularly when substantially equimolar proportions of the dichloroaniline and alkyl orthoformate had been used initially. In the presence of excess dichloroaniline, however, the neutralization step may serve to minimize subsequent reaction of the formimidate product during an isolation step which may involve distillation. As will be apparent to those skilled in the art, the procedure employed for isolating the formimidate will depend upon the presence or absence of by-product alkanol, reactant excesses, etc. Generally when substantially equimolar quantities of the dichloroaniline component and the alkyl orthoformate component have been employed, the reaction has been carried to completion, and the alkanol has been condensed off, the reaction product comprises the substantially pure alkyl N-dichlorophenylformimidate. When the presence of alkanols, other by-products, or unreacted reactants is suspected in the reaction mixture, the formimidate is readily recovered from the crude reaction product by isolating procedures customarily employed in the art, e.g., by solvent extraction or distillation.

The present alkyl N-dichlorophenylformimidates are stable, well characterized compounds which are advantageously employed for a variety of commercial and agricultural purposes, e.g., as lubricant additives, as plasticizers for synthetic resins and plastics, etc. As will be shown hereinafter they are particularly valuable as herbicides and as fungicides.

The invention is further illustrated, but not limited, by the following examples:

Example 1

3,4-Dichloroaniline (81.0 g., 0.59 mole) was mixed with 111.0 g. (0.75 mole) of freshly distilled ethyl orthoformate, four drops of concentrated sulfuric acid was added to the resulting mixture, and the whole was heated to reflux (pot temperature, 87° C.) within 40 minutes. Refluxing was continued at a pot temperature of 87–88° C. for 30 minutes, at a pot temperature of 88–104° C. for 20 minutes, and finally at a pot temperature of 104° C. to 143° C. for 1 hour and 25 minutes. During the refluxing 44.9 g. of by-product ethanol was collected. When the reaction mixture had cooled to 80° C., as was neutralized with anhydrous potassium carbonate, and unreacted ethyl orthoformate (37.8 g.)

was stripped off at water pump vacuum. Distillation of the residue at reduced pressure in a packed column gave 84.9 g. (78.3% theoretical yield based on the dichloroaniline) of the substantially pure ethyl N-3,4-dichlorophenylformimidate, B.P. (pot temp.) 113–144° C./0.35–1.1 mm. (mostly 128–139/0.35–0.75 mm.) and analyzing as follows:

|  | Found | Calcd. for $C_9H_9Cl_2ON$ |
| --- | --- | --- |
| Percent C | 49.65 | 49.57 |
| Percent H | 4.16 | 4.16 |
| Percent N | 6.46 | 6.42 |

Example 2

A mixture consisting of 81.0 g. (0.59 mole) of 2,5-dichloroaniline, 111.0 g. (0.75 mole) of freshly distilled ethyl orthoformate and 4 drops of concentrated sulfuric acid was heated to refluxing within 35 minutes, and refluxing was continued at a pot temperature of 87–91° C. for about 1.5 hours and then for an additional 1 hour and 22 minutes at a pot temperature of 91–146° C. During the refluxing 45.4 g. (98.5% of theory) of by-product ethanol was collected. After allowing the reaction mixture to cool to 74° C., it was treated with 2 g. of potassium carbonate. Unreacted ethyl orthoformate (37.1 g.) was stripped off the reaction mixture at water-pump pressure and the residue was distilled to give 90.9 g. (82.6% theoretical yield) of the substantially pure ethyl N-2,5-dichlorophenylformimidate, b.p. (pot temperature) 106–148° C./1.4–4.0 mm., which solidified in the receiver to a white to pale yellow solid, softening at about 45° C., melting at 51–53° C., and analyzing as follows:

|  | Found | Calcd. for $C_9H_9Cl_2ON$ |
| --- | --- | --- |
| Percent C | 49.69 | 49.57 |
| Percent H | 4.18 | 4.16 |
| Percent N | 6.46 | 6.42 |

Example 3

The ethyl N-3,4-dichlorophenyl formimidate of Example 1 and the ethyl N-2,5-dichlorophenylformimidate of Example 2 were tested against the fungi *Aspergillus niger* employing the following testing procedure:

Respective 1% stock solutions of each of said formimidates in a non-toxic solvent were made up, and these solutions were respectively added to containers of sterile, melted Dextrose agar in quantities to give 1 part of formimidate per 1,000 parts of agar. After thorough mixing, the respective agar mixtures were poured into Petri dishes and allowed to harden. One drop of a spore suspension of the fungus served as inoculum for each plate. The inoculated plates were incubated at a temperature of 25° C., for 5 days. At the end of that time inspection of the dishes showed complete inhibition of growth of the test fungus, whereas "controls," i.e., Petri dishes of agar containing no test chemical but similarly inoculated and incubated showed extensive fungus growth.

Example 4

This example shows testing of the ethyl N-2,5-dichlorophenylformimidate of Example 2 against the bacteria *Micrococcus pyogenes var. aureus* and *Salmonella typhosa*. The 1% stock solution of Example 4 was respectively added to melted nutrient agar to give a test mixture containing 1 part of test compound per 1,000 parts of agar. Petri dishes were filled with each of the test mixtures, and the plates thus prepared were then inoculated with the test organisms and incubated for 2 days at a temperature of 37° C. At the end of that time inspection of the plates showed complete inhibition of growth of both the *M. pyogenes* and the *typhosa* organisms by each of the two test mixtures, whereas "control" inoculated nutrient agar plates showed profuse growth.

Example 5

In this example there is compared the pre-emergence herbicidal efficiency of the ethyl N-3,4-dichlorophenylformimidate of Example 1 with the ethyl N-3-chlorophenylformimidate and the ethyl N-phenylformimidate of the prior art.

Aluminum pan flats 13" x 9" x 2" were partially filled with a 2:1 soil-sand mixture which was compacted to a depth of ⅜" from the top. Twenty seeds each of brome-cheat grass, rye grass, buckwheat, sugar beet, corn, barnyard grass, crabgrass and pigweed were scattered over the surface. The seeds were then covered with the soil mixture to the top of the pans. To furnish a uniform nutrition level and to prevent insect infestation, the pans were next sprayed with 30 cc. of an aqueous solution containing 1% of a liquid fertilizer and 0.1% of octamethylpyrophosphoramide. Finally, the pans were sprayed respectively with 30 cc. of herbicidal compositions prepared by dissolving 0.4 g. of one of the formimidates designated below into 20 cc. of acetone and diluting a 10 ml. aliquot of the resulting acetone solution with water to 30 cc. Application of this quantity of solution to one of said flats is calculated to correspond to the use of 25 lbs. of the formimidate per acre. The flats were then placed in ½" of water and allowed to absorb moisture through perforated bottoms until the soil surface was completely moist. The flats were then transferred to a wet sand bench in the greenhouse and maintained there for two weeks.

Observation of the flats at the end of that time showed that in the flat which had been sprayed with the ethyl N-3,4-dichlorophenyl formimidate only the corn had emerged and was flourishing; complete suppression of all of the other plantings had been effected in this flat. On the other hand, in those of the pans which had been sprayed with either ethyl N-3-chlorophenylformimidate or ethyl N-phenylformimidate, there was no evidence of harmful effect, all of the seeds having germinated into seedlings which showed no evidence of phytotoxic effect.

The above test shows ethyl N-3,4-dichlorophenylformimidate to possess a most interesting selective effect; at the test concentration it can be used to de-weed a field planted to corn without injury to the corn.

The present alkyl dichlorophenylformimidates may be applied as fungicides or herbicides by any suitable method, for example as sprays or as dusts comprising an inert carrier which may be a liquid or powdered solid. When used as sprays they may be employed in solution or in emulsion form. I have found that oil-in-water emulsions of the alkyl N-dichlorophenylformimidates possess an improved tendency to adhere to the treated organism and that less of the active ingredient, i.e., the alkyl N-dichlorophenylformimidate, is required to give comparable fungitoxicity or contact herbicidal effect. The emulsions are readily prepared by first preparing a solution of the N-dichlorophenylformimidate in an organic solvent and then adding the resulting solution to water containing an emulsifying agent to form an emulsion. Emulsifying agents which may be employed are those customarily used in the art for the preparation of oil-in-water emulsions. The word "oil" is here used to designate any organic liquid which is insoluble in water. Examples of emulsifying agents which may be used include alkyl benzene sulfonates, long chained polyalkylene glycols; long chained alkyl sulfosuccinates, etc.

What I claim is:
1. A compound of the formula
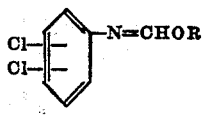
in which R is an alkyl radical of from 1 to 5 carbon atoms.
2. Ethyl N-3,4-dichlorophenylformimidate.
3. Ethyl N-2,5-dichlorophenylformimidate.
References Cited in the file of this patent
UNITED STATES PATENTS
| | | |
|---|---|---|
| 2,203,431 | Goldsworthy | June 4, 1940 |
| 2,217,207 | Horst | Oct. 8, 1940 |
| 2,220,981 | Horst | Nov. 12, 1940 |
| 2,684,976 | Glickman | July 27, 1954 |